No. 798,126. PATENTED AUG. 29, 1905.
E. J. ANTONI.
MATTRESS FILLING MACHINE.
APPLICATION FILED SEPT. 22, 1902.
6 SHEETS—SHEET 2.
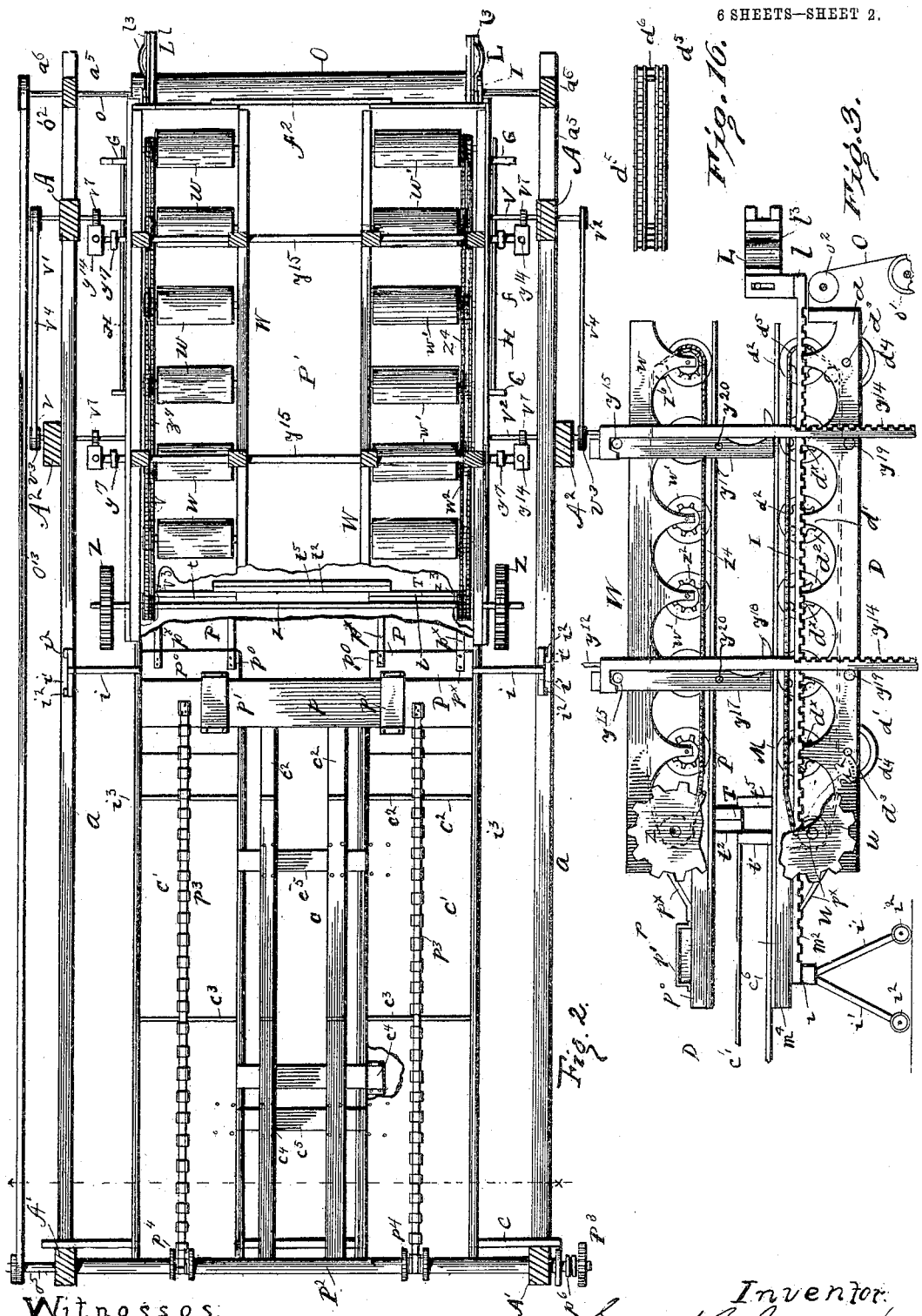

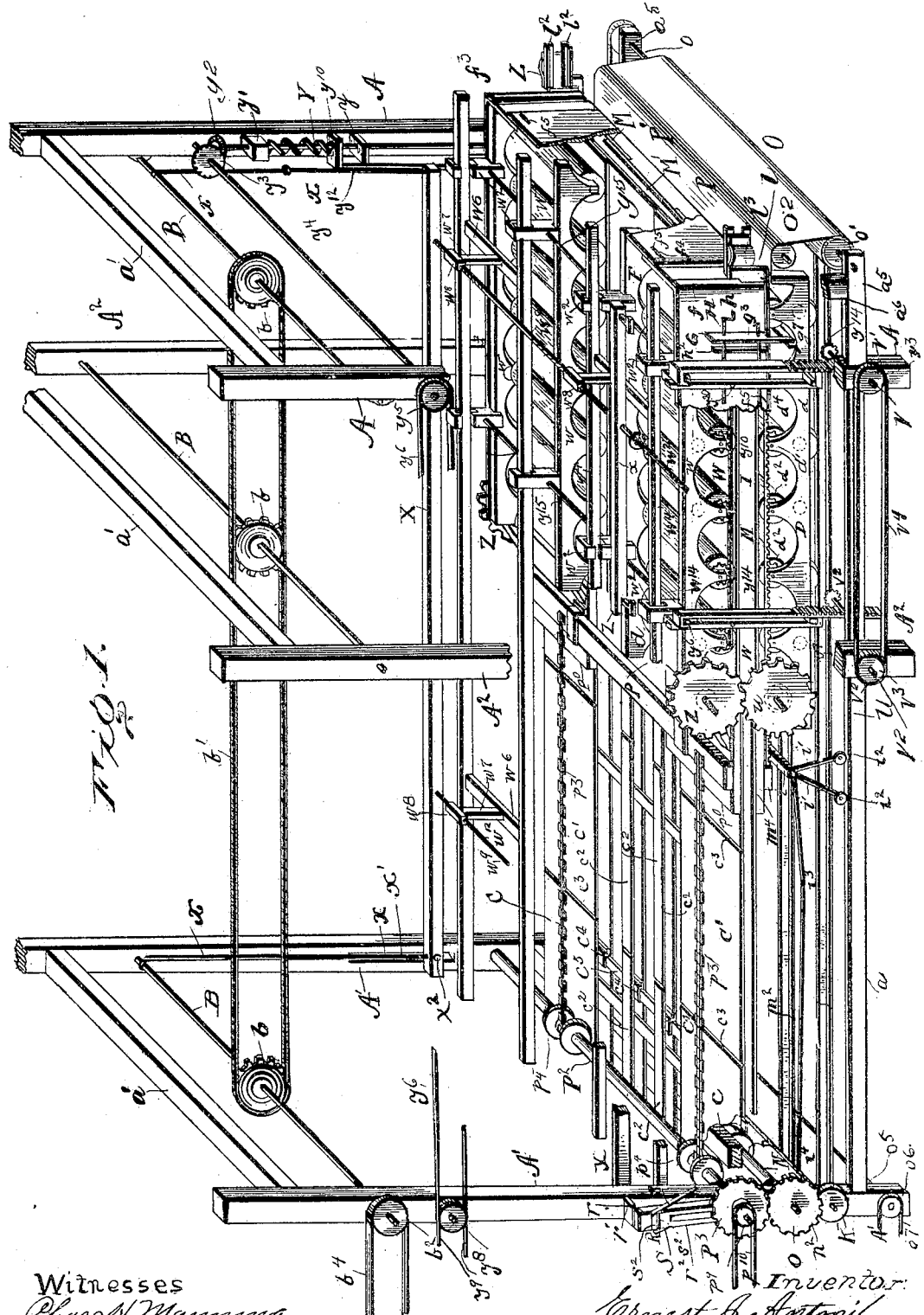

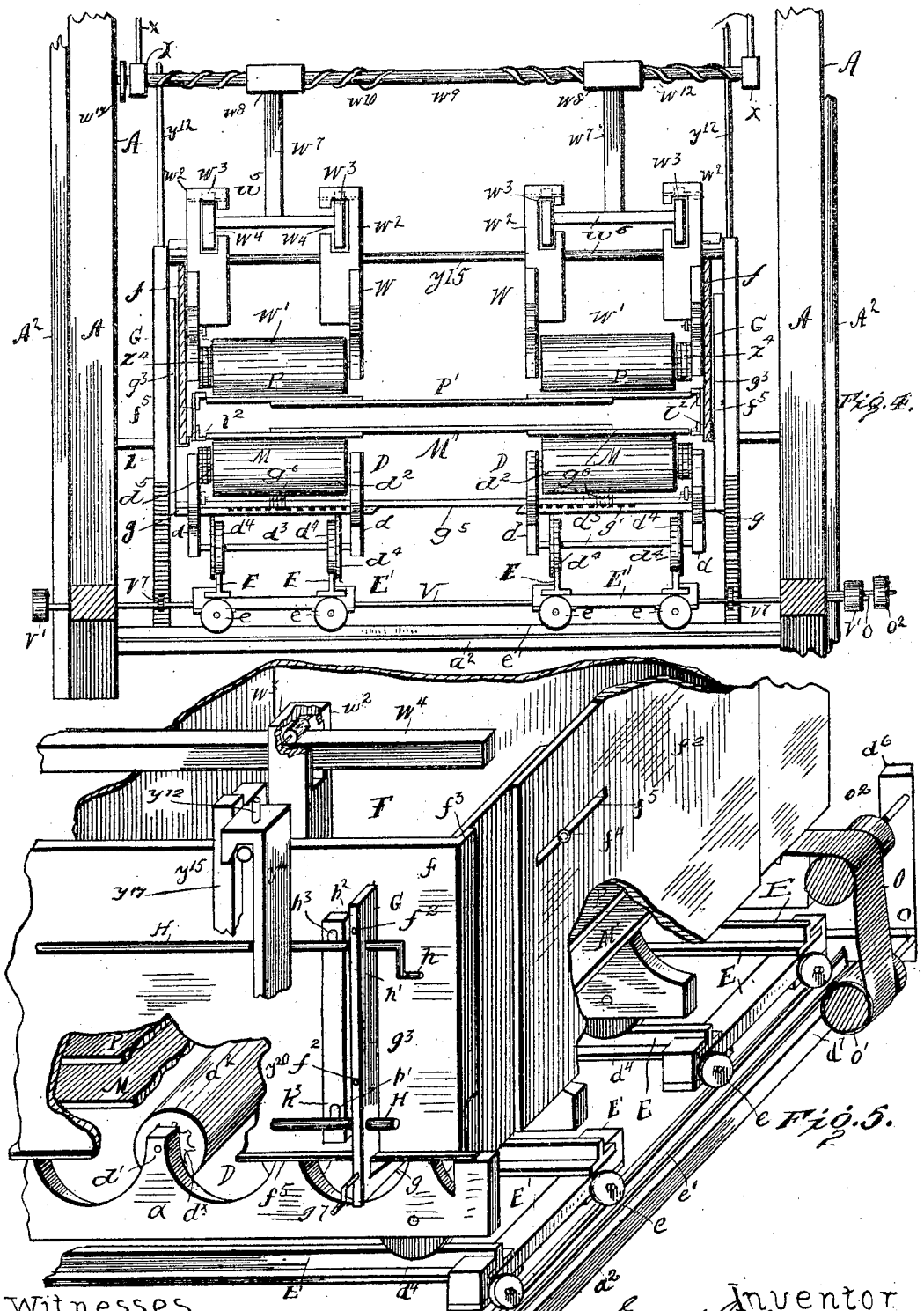

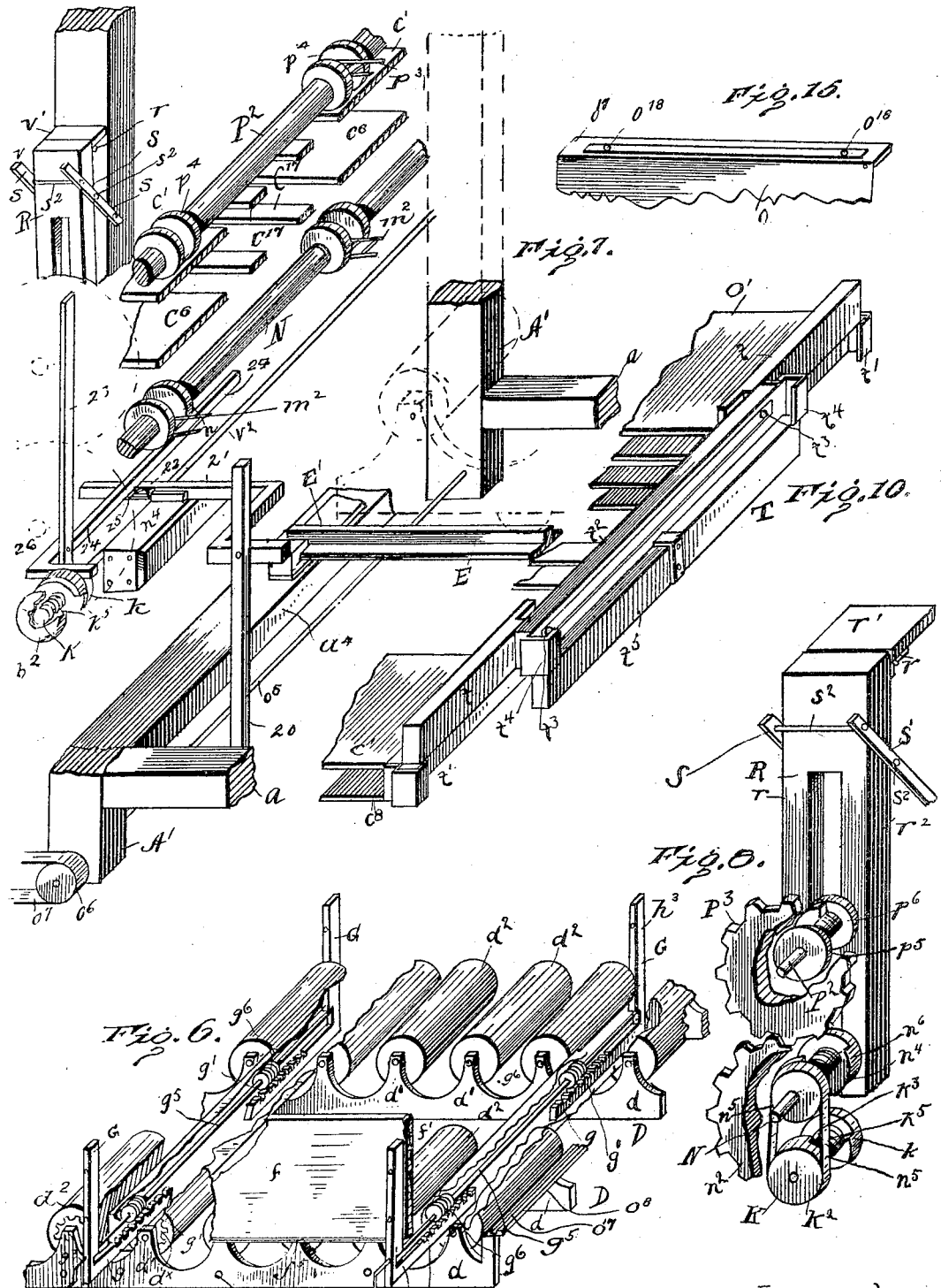

No. 798,126. PATENTED AUG. 29, 1905.
E. J. ANTONI.
MATTRESS FILLING MACHINE.
APPLICATION FILED SEPT. 22, 1902.

6 SHEETS—SHEET 5.

Witnesses: Inventor.

UNITED STATES PATENT OFFICE.

ERNEST J. ANTONI, OF KANSAS CITY, MISSOURI.

MATTRESS-FILLING MACHINE.

No. 798,126. Specification of Letters Patent. Patented Aug. 29, 1905.

Application filed September 22, 1902. Serial No. 124,478.

*To all whom it may concern:*

Be it known that I, ERNEST J. ANTONI, a citizen of the United States of America, residing at Kansas City, in the county of Jackson and State of Missouri, have invented certain new and useful Improvements in Mattress-Filling Machines; and I do hereby declare that the following is a full, clear, and exact description of the invention, such as will enable others to make and use the same, reference being had to the accompanying drawings, forming a part of this specification.

My invention has for its object, primarily, a machine for the performance expeditiously of the various steps in mattress-filling, in giving form to the mattress material or filler and its compression, the inclosure of the filling or mattress material by the cover or tick, and its manipulations in consecutive order; second, to adjust the machine to the general size of mattress required; third, to hold in check the filler in mattress material during the withdrawal of the compression-plates; fourth, to support the mattress when the carriages are removed from their normal position.

The invention consists in the novel construction and combination of parts, such as will first be fully described, and specifically pointed out in the claims.

Figure 9:
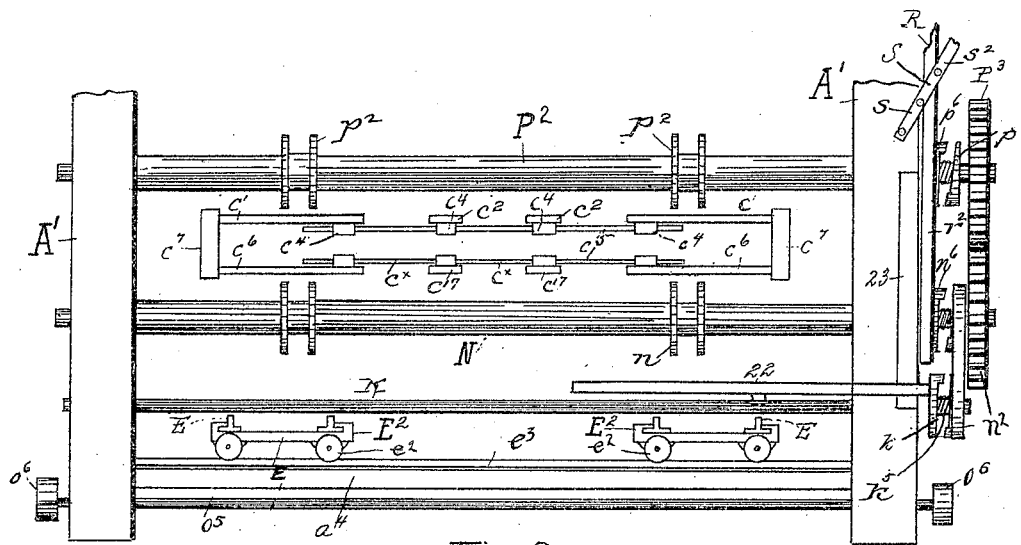
Figure 12:
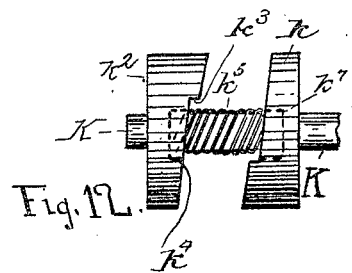
Figure 11:
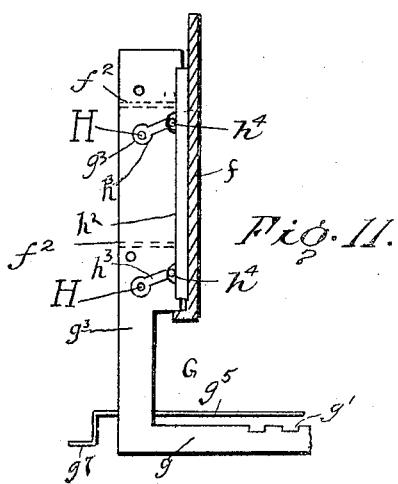
Figure 13:
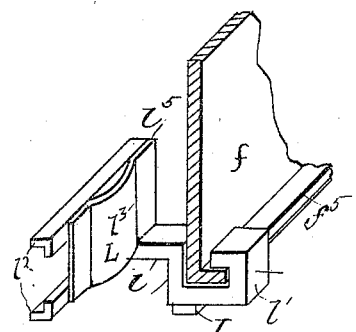
Figure 14:
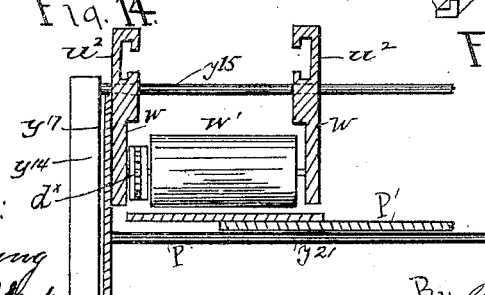
Figure 12:
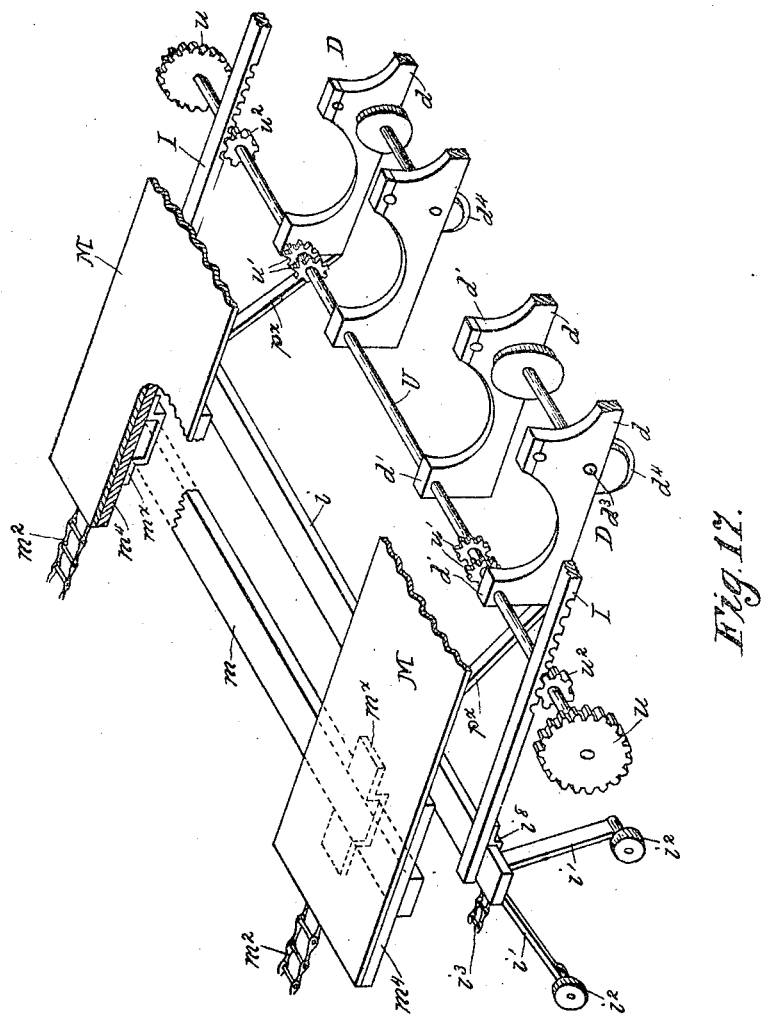

In the drawings, Figure 1 is an isometrical view of the novel mattress-filling machine, a portion of the shaft-supporting standards upon the near side of the machine being broken away. Fig. 2 is a plan view of the machine with the standards removed. Fig. 3 is a side view in detail of the movable mattress supporting and compressing carriages, showing the vertical and horizontal racks. Fig. 4 is a view in detail of the forward end of the machine, the upper portion of the shaft-supporting standards being broken away and the apron removed, showing the slidable filler, compressing-plates, the transverse stationary tracks, and the separate forwardly-movable upper and lower carriages, the racks and gear for compressing the upper carriage upon the lower carriage, and the oppositely-threaded spiral shaft for moving the carriages to and from each other. Fig. 5 is an enlarged broken view in detail of the side and end of the filler-receptacle, showing the removable telescopic parts of the end of the receptacle, a portion of the side of the receptacle being broken away to show the mattress-supporting and tick-feeding rollers and also the telescopic upper and lower filler-compressing plates. Fig. 6 is a detail view in perspective of the lower carriage, showing the supporting-frame for the filler or stock receptacle, the racks and the shafts upon the frame, and the worm-gear engaging with the rack. Fig. 7 is a broken transverse sectional view of the rear end of the machine, taken upon the line $xx$ of Fig. 2, showing the mechanism acted upon by the movable carriage in its rearward movement to throw in gear the power-transmitting devices for the withdrawal of the compressing-plates within the tick and above and below the filler and also reversing the action of the carriage. Fig. 8 is a detail broken view of one of the standards at the rear end of the machine, showing enlarged views of the meshing gear and the shaft therefor and the clutch mechanism. Fig. 9 is a detail rear end view of the machine, showing the stationary platform, the movable carriages, and the operating shafts and clutches. Fig. 10 is a view in perspective of the adjustable stationary filler stop-blocks or headers, showing portions of the upper and lower stationary platform-plates. Fig. 11 is a detail side view of the upright portions of the braces supporting the sides of the receptacle, showing the crank-arms for moving the said sides forward in position. Fig. 12 is a detail view of the clutch on the shaft operating the racks in the sides of the stock-receptacle. Fig. 13 is a detail view of a portion of the side of the stock-receptacle, showing the flange on its lower edge, and the tick-holding clamps on the forward end of the rack, and the guide on the rack-bar. Fig. 14 is a rear end view of a portion of one side of the movable upper carriage, showing the compression-plates and supporting-rod. Fig. 15 is a detail view of the slotted bar on the rear end of the carriages, showing a portion of the canvas apron. Fig. 16 is a plan view of a portion of the triple sprocket-chains. Fig. 17 is a detail view in perspective, showing broken portions of the rear ends of the lower carriages and the shaft actuating the sprocket-chains, the adjustable rack-bars and pinions on said shaft, also the rear ends of the adjustable compression-plates on the lower carriages.

Similar characters of reference indicate corresponding parts in all the figures of the drawings.

The stationary parts of the machine, as seen in the drawings, to which reference is now made, and particularly to Fig. 1, comprise the vertical standards A A, located a short distance in rear and upon opposite sides of the forward end of the machine, and the standards A′ A′ at the rear end of the machine, and which are respectively in line with each other. With the inner side of the forward standards A A, a short distance above the lower end of said standards, are connected rigidly the forward ends of the horizontal beams $a\ a$, the rear ends of which beams are connected with the inner side of the standards A′ A′.

A short distance in rear of the forward standards A A or approximately one-fourth the distance rearwardly from the standards A to the standards A′ A′ are the standards $A^2\ A^2$, which are secured rigidly to the outer side of the beams $a\ a$. The upper ends of the respective standards A A, $A^2\ A^2$, and A′ A′ are connected by the transverse beams $a'\ a'\ a'$.

A short distance beneath each of the beams $a'\ a'\ a'$ are the horizontal shafts B B B, the ends of which shafts are journaled in the respective standards A A A′ A′ $A^2\ A^2$. Upon each shaft B is a sprocket-wheel $b$, located about equidistant from the ends of the shaft. Over the sprocket-wheel $b$ on each shaft is extended an endless sprocket-chain $b'$. Upon the end of shaft B on the rear standards A′ A′, which extends a short distance beyond the outer side thereof, is a fixed band-pulley $b^2$, over which passes a power-transmitting belt $b^4$, which extends over the power-wheel of an engine. (Not shown.)

With the extreme lower end of the standard A′ on the inner side is connected one end of a transverse beam $a^4$, the other end of which beam is connected with the inner side of the other standard A′. A short distance above the position of the beam $a^4$ and on the forward side of the standards A′ A′ is a transverse beam $c$. (See Figs. 1 and 2.) This beam is made to sustain the rear end of a stationary platform C, which is in separate longitudinal parts, the intention of the invention being to adapt the width of the platform to correspond with the width of the movable parts of the machine hereinafter described. The rear ends of the outer longitudinal plates $c'\ c'$ of platform C and the intermediate longitudinal plates $c^2\ c^2$ rest upon the beam $c$, and in the upper surface of said plates $c'\ c'\ c^2\ c^2$ are transverse grooves $c^3$ for the purpose hereinafter described.

Upon the under side of the intermediate plates $c^2\ c^2$ at points about one-third the distance inwardly from each end are guide-plates $c^4$, and upon the under side of the plates $c'\ c'$ near the inner edges are similar guide-plates, in which are the transverse supporting and guiding bars $c^5\ c^5$. Beneath the plates $c'\ c'$ and $c^2\ c^2$ of platform C are a series of plates $c^6\ c^6$ and $c^{17}\ c^{17}$ of precisely the same widths as the plates $c'\ c'\ c^2\ c^2$ and of the same length, the intermediate plates being supported by transverse plates $c^\times\ c^\times$. With the rear ends of the plates $c'\ c'$ and rear ends of plates $c^6\ c^6$ directly beneath are connected rigidly the end plates $c^7\ c^7$, the distance apart of said plates being less than the thickness of the mattress when compressed. The forward ends of the plates $c'\ c'$, $c^2\ c^2$, and $c^6$ extend from the rear end of the machine in the direction of the forward end about one-half of the distance, and the said forward ends of the plates $c'\ c'\ c^2\ c^2$ are connected by end plates $c^8\ c^8$, (shown in Fig. 10,) which are similar to the end plates $c^7\ c^7$. The forward ends of the plates $c'\ c'$, $c^6\ c^6$, and $c^6$ are supported by the rear end of the movable carriages D D, as seen in Fig. 3, which, as shown, is normally in position at the forward end of the machine and forms one of the movable parts. The lower carriages D D each consist of the sides $d\ d$, arranged at short distances apart, and upon the upper edges of which are a series of upward extensions $d'$ in arcs of circles in which are journaled the series of rollers $d^2$. At each end of the frames D D are the axles $d^3$, journaled in the lower edges of the sides $d\ d$, and upon which axles are the flanged wheels $d^4\ d^4$.

Beneath each one of the carriages D D and the flanged wheels $d^4\ d^4$ are the longitudinal track-rails E E, which extend the entire length of the machine. The forward ends of the track-rails E E are mounted upon a transversely-movable rail-tie E′, which tie is supported by the flanged wheels $e\ e$, which are journaled upon the outer side and each end of the tie.

Beneath the wheels $e\ e$ is a track-rail $e'$, supported by a transverse beam $a^2$, which extends from the inner side of the standard A a short distance above the lower ends of said standards to the inner side of the other standard. The rear ends of the track-rails E E are supported by a transverse tie $E^2$, upon which are the wheels $e^2\ e^2$.

Beneath the wheels $e^2\ e^2$ is a track $e^3$, which is parallel with the track $e'$ and is mounted upon the transverse beam $a^4$, extending from the inner sides of one standard A′ to the inner side of the other standard.

At each end of the carriages D D are the fixed braces G for the sides $f\ f$ of the receptacle F for the stock or mattress-filling material. These braces are located at the rear ends of the carriages D D equidistant from the rear upward extensions $d'\ d'$ of the sides $d\ d$, and the forward braces are located equidistant from the forward upward extensions $d'\ d'$ of said sides. These braces consist of the horizontal portions $g\ g$, which extend transversely to the frames D D and a short distance beyond the outer sides of said frames and upon the upper edges of which portions are the worm-teeth $g'$.

At the outer end of the horizontal portions $g\ g$ of the braces are the upward portions $g^3\ g^3$, through which portions $g^3\ g^3$ of the braces on each carriage D and at each end extend the rods $g^5$ $g^5$, upon which rods are the worm-wheels $g^6$ $g^6$, which engage with the worm-teeth. Upon the outer end of each of the rods $g^5$ $g^5$ is a crank $g^7$, by means of which the carriages D D are operated in a movement to and from each other.

The sides $f$ $f$ of the receptacle F for the stock or mattress material are supported by the pins $f^2$ $f^2$, (see Fig. 11,) which are connected with the outer surface of the sides $f$ $f$ and extend loosely through the openings in the vertical portion $g^3$ of the braces G and are of the proper lengths to admit of the inward movement of the said sides a short distance from the said portion $g^3$ of the brace or post. The sides $f$ $f$ are moved inwardly by means of the longitudinal rods H H, which extend transversely through the vertical portion or post $g^3$ of the braces G near the upper end and also near its connection with the horizontal portion of brace G and intermediate its outer and inner edges, and upon the ends of said rods are the cranks $h$. Between the rods H and the outer surface of the sides $f$ $f$ are the vertical bars $h^2$ $h^2$, and upon the rods H H are crank-arms $h^3$ $h^3$, the outer ends of which arms are pivotally connected at $h^4$ with the bars $h^2$. (See Fig. 11.)

Upon journals of the rollers $d^2$ are the sprocket-wheels $d^\times$ $d^\times$, over which passes a triple sprocket-chain $d^5$ $d^5$, which are connected at intervals by links $d^6$, so that an intermittent movement may be communicated when desired to the sprocket-wheels $d^\times$ $d^\times$, the sprocket-chains passing over the sprocket-wheels $u'$ $u'$ on the shaft U, hereinafter described.

Upon the inner side of the receptacle F and adjacent to the sides $f$ $f$ are the racks I I, which extend from the rear end of the carriages D D to the forward end, and upon said end is a clamp L, hereinafter described. The forward ends of the racks I I are slidably connected by means of clasps $i^8$ $i^8$ (see Fig. 17) with a transverse bar $i$, extending transversely to the machine and to a position at each end directly above the longitudinal beams $a$ $a$ on the standards A A and A' A', which bars are each supported by the legs $i'$ $i'$, upon the lower ends of which legs are the wheels $i^2$ $i^2$, which wheels travel on the upper surface of said beams $a$ $a$. (See Fig. 2.) With the bar $i$ is connected, near the racks I I, the inner ends of the chain belts $i^3$ $i^3$, the outer ends of which belts are connected with and extend over the lower transverse shaft K on the standards A' A' at the rear end of the machine. (See Figs. 1 and 2.) One end of shaft K extends through one standard A', and upon said end is keyed the inner portion $k$ of a slidable clutch. (See Fig. 8.) Upon the outer end of shaft K is placed a fixed wheel $k^2$, upon the inner side of which is the outer portion $k^3$ of the clutch, as seen in the detail in Fig. 12. In the portion of the clutch $k^2$ is a depression $k^4$, (shown in dotted lines,) which receives one end of a spiral spring $k^5$, and on the portion $k$ of the clutch is a depression $k^7$, (shown in dotted lines,) which receives the other end of the spring. This clutch is operated as further described.

The rear end gate $f^2$ of the receptacle for the stock or material for the mattress consists of three separate slidable and adjustable plates, the ones adjacent to the side plates being secured in position by the inwardly-extending cleats $f^3$ $f^3$ and the intermediate portion by the bolts $f^4$ $f^4$, movable in the slots $f^5$ on the said intermediate portion.

Upon the rollers $d^2$ $d^2$ of the carriages D D are laid the longitudinal stock-plates M M, which are of the same relative width as the carriages and extend in length from the rear end of said carriages to the forward end. Upon these plates M M rest the longitudinal edges of an overlapping plate M', upon which plates the stock is laid. With the under surface and the rear ends of each of the slidable plates M M are connected rigidly a block $m^4$ and adjustably with said blocks a transverse plate $m$ by means of clasps $m^\times$, as shown in Fig. 17. Said blocks $m^4$ $m^4$ are located a short distance in advance of the forward end of the carriages D D and above the racks I I. The blocks $m^4$ are connected by the straps $p^\times$ with the forward end of the carriages D D, as seen in Fig. 3. With the transverse plate $m$ are connected the inner ends of the chain belt $m^2$ $m^2$, the outer ends of which chain belts extend over and are wound between the chain-guides $n$ $n$, which are located upon the transverse shaft N, which shaft extends through the standards A' A' and is directly beneath the transverse beam $c$, supporting the rear ends of the plates $c^6$. Upon one end of shaft N, extending beyond the outer side of standard A' above the shaft K, is a gear-wheel $n^2$. In rear of said wheel $n^2$ on shaft N is a loose portion $n^4$ of a clutch, over which passes an endless belt $n^5$, which belt also passes over the portion $k^2$ of the clutch on the shaft K. Upon shaft N in rear of the portion $n^4$ is a portion $n^6$ of the clutch, which is keyed to shaft N.

At the forward end of the machine and extending forwardly from the standards A A in a horizontal line with the beams $a$ $a$ are short supporting-beams $a^5$ $a^5$, in which are journaled the ends of a shaft $o$, upon which is a roller $o'$, upon which roller is wound one end of a canvas apron O. From the outer ends of beams $a^5$ extend the braces $a^6$ $a^6$, which extend upwardly a sufficient distance, and in the braces $a^6$ $a^6$ (see Fig. 5) a short distance above the roller $o$ is journaled a guide-roller $o^2$, over which passes the free end of the canvas apron O, and which end is connected with a longitudinally-slotted bar $o^{17}$, (see Fig. 15,) adjustably connected by the screws $o^{18}$ with the rear end of the carriages D D and is of sufficient length to extend as far as the carriages are moved. Upon the fore end of shaft $o$ is a band-guide roller $o^{12}$, over which passes an endless belt $o^{13}$, which belt extends to the rear end of the machine near the standard A', thence over a belt-pulley $o^{14}$ on the end of a shaft $o^5$, which shaft extends transversely through the lower ends of standards A' A' beneath the beams $a^4$ for the movable ties $E^2$, and upon the other end of the shaft $o^5$ is a freed and loose band-pulley $o^6$, over which passes a belt $o^7$, which belt is connected with a band-pulley upon an engine. (Not shown.)

Above the adjustable plates M M M' in the receptacle F for the stock are the adjustable plates P P P', which are similar to the plates M M M' and supported in position by rods, as further described, and which plates P P P' when the mattress is compressed are upon the top of the same. For the purpose of drawing the tick over the plates M M M' P P P' and the stock upon the forward ends of the racks I I are secured the clamps L L. These clamps normally are outside of the end gate $f^3$ of the receptacle, and each consists of an angle-plate $l$, the end of one of the portions of which angle-plate is connected with the upper surface and forward end of the rack I, and when the rack moves rearwardly comes in close position to and parallel with the inner surface of the side $f$ of the receptacle F. Connected with the angle-plate $l$ near the rack I is an upwardly-extended and inwardly-bent guide-plate $l'$, which extends beneath the flange $f^5$ upon the lower edge and outer surface of the sides $f$ $f$ of said receptacle and bears upon the upper surface of said flange. Upon the inner side of the vertical plate $l^5$ on the angle-plates $l$ are the jaws $l^2$ $l^2$, which consist of short angle-bars parallel with each other and rigidly connected with the plate $l^5$. The upper angle-bar $l^2$ slides upon the upper surface and longitudinal edges of the plates P P. The lower angle-bars slide upon the under surfaces of the plates M M and the longitudinal edges of said bars when the plates are compressed together and the rack-bars $l$ $l$ are moved forwardly.

Upon the outer side of each of the jaws $l^2$ $l^2$ is a curved spring $l^3$, which is connected with plate $l^5$ and integral therewith and which grips the open end of the tick. With each of the rear ends of the plates P P are connected a block $p^0$ $p^0$, with which blocks is connected a transverse plate $p$ by means of the clasps $p'$ $p'$. With the blocks $p^0$ $p^0$ is connected braces $p^\times$ $p^\times$, which extend to the forward end of the carriages W W. With the transverse plate $p$ is connected the inner ends of the chain belts $p^3$ $p^3$, the outer ends of which chain belts are connected with and wound upon a grooved pulley $p^4$ $p^4$ on a transverse shaft $P^2$ on the standards A' A', which shaft is located above the plane of platform C, and the end of which shaft toward the standard A' supporting the gear $n^2$ extends through said standard and a short distance beyond the outer side thereof, and upon said end is a loosely-connected gear-wheel $P^3$, which meshes with the teeth on the gear $n^2$ directly below. Upon the inner side of the gear $P^3$ is a portion of a clutch $p^5$ and a sliding keyed portion $p^6$. Upon the outer side of gear $P^3$ is a band-pulley $p^9$, over which passes a belt $p^{10}$.

Upon the outer side of the standard A' in rear of the movable parts $p^6$ on shaft $P^2$ and $n^6$ on shaft N is a slotted clutch-operating bar R, the upper end of which is hinged at $r$ to an outwardly-extended block $r'$, the slotted portions $r^2$ $r^2$ extending downwardly on opposite sides of shafts $P^2$ and N in rear of the inner portions $p^6$ on said shaft $P^2$ and the portion $n^6$ of the clutch on said shaft N. This bar is operated by the lever S, which consists of the separate bars $s$ $s$, pivoted at the inner ends to the sides of the standard A'. With the side bars $s$ $s$ are pivotally connected two cross-bars $s^2$ $s^2$, one bearing on the outer side of the bar R and the other on the inner side, whereby the bar is moved at its lower end outwardly and the clutches on shafts $P^2$ and N caused to engage, as hereinafter described.

With the forward end of the platform C within the space between the lower plates M M M' on carriages D D and the upper plates P P P' is the adjustable header T, which closes the outer opening between the plates and obstructs the spreading of the stock when the compression is made. This header consists of separate vertical bars $t$ $t$, slidable in the guide-blocks $t'$ $t'$ on the outer surface of the plates $c^8$ at the forward end of the platform C. With the forward surfaces or sides of said bars $t$ $t$ is adjustably connected the ends of the vertical bar $t^2$, said bar being grooved longitudinally and through which extend the adjusting-bolts $t^3$. At the ends of the bar $t^2$ are guiding-lugs $t^4$ $t^4$, in which is inserted a bar $t^5$, the said lugs $t^4$ $t^4$ being at the upper edge of the bar $t^2$ and the bar $t^5$ narrower in width, so as to permit the adjusting-bolts to be easily reached.

Upon the forward end of the carriages D D and extending transversely through the forward ends $d$ $d$ of each carriage is a shaft U, upon each end of which shaft, outside of the vertical sides $f$ $f$ of the receptacle F, are large gear-wheels $u$ $u$. Upon the shaft U are small spur-gears $u^2$ $u^2$, (see Fig. 17,) which engage with the racks I I and the shaft actuated thereby when the racks are drawn rearwardly.

At the forward end of the machine is the transverse shaft V, which passes beneath the longitudinal track-rails E E, and thence at each end through the standards A A, and upon each end of said shaft is a band-wheel $v'$. A separate shaft $V^2$ extends through the standards $A^2$ $A^2$ upon the same horizontal plane as the shaft V, upon the ends of which are the band-wheels $v^3$ $v^3$, over which wheels $v^3$ and over the wheels $v'$ pass the endless belts $v^4$. Upon the shafts V $V^2$ and a short distance outwardly from the vertical line of the sides $f f$ of the receptacle F are the small gears $v^7 v^7$.

W W represent the separate upper compression-carriages, which are rearwardly and also upwardly movable and are similar to the carriages D D reversed in position and of the same length and width, the series of rollers $w' w'$ being in a vertical line with the rollers on the said carriages D D, and said rollers bear during compression upon the stock upon the upper surface of the plates P P. Upon the inner side and at each end of the sides $w w$ of the separate carriages W W are the hangers $w^2 w^2$, in the upper portion of which are the antifriction-rollers $w^3$. (See Fig. 5.)

Through the hangers $w^2 w^2$ extend the longitudinal suspension-bars $w^4 w^4$, which extend the length of the machine and upon which the carriages W W move rearwardly and forwardly into position. With the bars $w^4 w^4$, supporting the separate carriages W W, are connected the transverse bars $w^6$, which are arranged in series the proper distance apart in the direction of the length of bars $w^4 w^4$, and with said bars are connected an upright bar $w^7 w^7$, upon the upper ends of which bars are the worm-sleeves $w^8 w^8$, through which sleeves extend a transverse rod $w^9$, upon which are the right and left hand screw-threads $w^{10} w^{12}$. The ends of the rods $w^9 w^9$ extend to and are journaled in a longitudinal beam X on the inner side of the standards A A' and in a similar longitudinal beam on the inner side of the opposite standards, said beams extending nearly the length of the machine. Upon the forward ends of the rods $w^9 w^9$ are hand-wheels $w^{14} w^{14}$, by means of which the upper carriages are drawn together when required.

With the opposite ends of the longitudinal beams X X are connected the elevating-ropes $x x$, which extend to and are connected with the shafts B B on the standards A A A' A'. On the inner side of the standards A' A' are vertical grooves $x'$, in which extend a pin $x^2$ on the ends of the beams X X, and which guide the beams when raised in position.

In order to impart a downward movement to the upper carriages W W, and consequently compress the material or stock, upon the inner sides of the standards A A is a stationary lug $y$, in which is seated the lower ends of a worm-shaft Y, the upper end of which shaft being secured in a corresponding lug $y'$, the said lugs and worms being in position at suitable heights upon the standards. The upper end of the worm-shaft Y extends through the upper lugs $y'$, and upon said ends are the bevel-gear $y^2$, which mesh with the bevel-gear $y^3$ on a transverse shaft $y^4$. The outer end of shaft $y^4$ extends through the standard A, and upon said end is a band-pulley $y^5$, over which passes a belt $y^6$, which extends to the outer side of the rear standard A', thence over the broad band-pulley $y^7$ on the stud-shaft $y^8$ on the outer side of said standard, over which band-pulley $y^7$ passes a belt $y^9$, which belt is connected with the source of power operating the machine.

Upon the worm-shaft Y is a worm-sleeve $y^{10}$, with the side of which is connected the upper end of the rods $y^{12} y^{12}$, the lower end of which rods extends downwardly to the line of the upper edge of the receptacle F and are connected with the rear racks $y^{14} y^{14}$, which engage with the small spur-gear $v^7$ on the shaft V. The racks $y^{14}$ at the upper end are bent rearwardly and hook over the ends of the transverse rods $y^{15}$, which rods extend transversely to the carriages W W and through the forward and rear supports or hanger $w^2 w^2$ for the carriages W W, just above the line of the upper edges of said carriages.

On the inner side of the racks $y^{14}$ are the hooks $y^{17} y^{17}$, through the upper ends of which hooks pass loosely the rods $y^{15} y^{15}$, supporting the rack $y^{14}$, the lower ends of which hooks extend downwardly about half the length of the racks $y^{14}$.

Upon the outer sides of the lower carriages D D and near the lower edge and beneath the hooks $y^{17} y^{17}$ are the fixed pins $y^{19} y^{19}$, over which the hooks $y^{17} y^{17}$ engage when the carriages W W and D D are drawn together and the stock compressed. In the hooks $y^{17} y^{17}$ are perforations $y^{20}$, about one-third the distance upwardly from the lower end of said bars, through which pass the rods $y^{21}$, (see Fig. 14,) which rods pass beneath the upper plates P P P' and support said plates in position before the time the material is compressed. (See Fig. 14.)

Through the forward end of the carriages W W passes the shaft $z$, upon which are the gear-wheels Z Z, which engage with the gear-wheels $u u$ on the carriage D D when the carriages W W and D D are brought together. Upon the journals of the rollers $w' w'$ of the upper carriages, toward the outer side of the carriages, are the sprocket-wheels $z^2 z^2$. Upon the shaft $z$, at the rear end of the carriages W W, are the sprocket-wheels $z^3 z^3$, and over which wheels passes the triple sprocket-chains $z^4$, which are similar to the sprocket-chains $d^5 d^5$ on the carriages D D, and connected at intervals by links, the slack in which chain above the sprocket-wheels being taken up by the idlers $z^6$.

Upon the rear end of the machine and pivotally connected with the inner side of the bars $a$ at a point a short distance forward from the standard A' is an upright bar 20, which is in the path of the rear end of the rack I upon a rearward movement of said rack. Upon the inner side and near the upper end of the bar is connected a horizontal bar 21, which is extended a short distance laterally, and thence bent at right angles and extended rearwardly beyond the standards A', and in the upper edge of said bar is a keeper 22.

Upon the rear side of the standard A' is pivotally connected an upright lever 23, which is provided with a horizontal arm 24, on the under side of which arm is a downwardly-projecting plate 25, which engages with the keeper 22. On the inner end of the lever 23 is a bent arm 26, which extends around the corner of the standard A' and in rear of the portion $k$ of the clutch on shaft K.

In operation of the machine power is first transmitted from the belt $b^4$ through the shafts B B to the ropes $x\,x$, which are wound on said shafts, thereby raising the longitudinal beams X X in position and the requisite height, and also the upper carriages W W from the receptacle F, the racks $y^{14}\,y^{14}$ being disconnected from the sides of said carriages. In the elevated position of the carriages they are moved rearwardly by hand upon the track-bars $w^4\,w^4$ to the rear end of the machine, thus affording working room in the receptacle F.

The upper slidable plates P P P' are carried by the rods $y^{21}\,y^{21}$, with the carriages W W, thus leaving the plates M M M' exposed and which form the bottom of the receptacle for the stock or mattress, the end-gate $f^2$ being in a closed position, and the adjustable bars $t\,t^2$, forming part of the head-block to the receptacle, are raised upwardly in position, and the outer ends of the bars $t\,t$ are brought close in position to the inner side of the lugs $t^4\,t^4$ and secured firmly in position by the adjusting-bolts $t^3\,t^3$.

As shown, the carriages are widely separated and in position to receive the material. The material, such as excelsior, is placed within the receptacle F upon the plates M M M', and upon the upper layer may be placed cotton or some such other material, as may be preferred. The usual quantity of excelsior will nearly fill the receptacle F, as this is placed loosely in place, so that the amount may be estimated which will pack with elasticity to make a firm mattress. As soon as the cotton top is in place the carriages W W are moved forward in position above the receptacle F and the shafts B B operated to lower the carriages, with the plates P P P', in position upon the stock. The racks $y^{14}\,y^{14}$ are then placed in position on the sides $f\,f$ of the carriages and hooked over the rods $y^{15}\,y^{15}$. The rods $y^{21}\,y^{21}$ are then withdrawn from the hooks $y^{17}\,y^{17}$ and beneath the plates P P P'. The cranks $h\,h$ on the side of receptacle F are then operated and the rod H and crank-arms, thus moving the compressing-sides $f\,f$ of the receptacle F a short distance toward each other, the adjusting-bolts $f^4$ in the adjustable part of the gate $f^2$ being loosened for the purpose.

Power being applied to the band-pulley $y^7$ on stud-shaft $y^8$ on the standard A' is transmitted through belt $y^6$ to the shaft $y^4$, to the bevel-gear $y^2\,y^3$, and the worm Y is rotated, forcing downwardly the rod $y^{12}$ and the rack $y^{14}$ to a position in which the hooks $y^{17}$ on the shaft $y^{15}\,y^{15}$ engage with the pins $y^{19}\,y^{19}$, the racks $y^{14}$ on the rear end of the receptacle operating the shaft V and the belt $v^4$ and shaft V' and spur-gear $v'$, which draws down the forward racks, and communicating an equal pressure of the rollers $w'\,w'$ of the carriages W W upon the plates P P P' and compressing the material equally at each end of the receptacle F and at the same time forcing the vertically-adjustable parts $t\,t\,t^2\,t^2$ of the header T downwardly within the lugs $t^4\,t^4$ upon the plates M M. The sides $f\,f$ of the receptacle are moved outwardly in position, so as to bring the angle-bars $l^2\,l^2$ of the clamps L L in line with the outer edges of the plates M M and P P. The end-gate $f^2$ is then removed from receptacle F. The tick or cover, which is of the usual description and open at one end, is placed opposite the clamps L L on the rack-bars I I, the sides of the tick passing between the springs $l^3\,l^3$ and the outer sides of the angle-bars $l^2\,l^2$ and held thereby.

The lever 23 being operated throws the parts of the clutch $k$ into engagement with the part $k^2$, the horizontal part 24 engaging with the keeper 25 in bar 21, compressing the spring $k^5$ and holding the parts of the clutch in engagement. This movement communicates power to shaft N from shaft K through the belt $i^3$ to the racks I, I, which draws the racks forward and also the cover or tick, the open end of the tick passing outside of the plates P P P' M M M' and inclosing them, the movement of racks I I causing the rotation of the rollers $d^2\,d^2$ and also communicating motion to the shaft U and gear-wheels $u$ and Z, which are connected, and the sprocket-chain $z^4$ to operate the rollers $w'\,w'$. The contact of the roller with the mattress-cover assists in drawing the cover over the plates P P P' and M M M' and the stock compressed between the said plates. Upon reaching the upright bar 20 at the rear end of the machine the transverse bar $i$ moves said bar 20 rearwardly, releasing the bar 24 and lever 23, and the spring $k^5$ between the parts of the clutch moves them apart and stops the action of the shaft K. As the clamps L L pass within the receptacle F the angle-bars $l^2\,l^2$ move past the outer edges of the plates M M and P P.

As soon as the forward movement of the racks I I is completed and the tick drawn in place the racks $y^{14}$ are drawn upwardly in position, the power-shaft being reversed for the purpose. The lever S is operated to cause the slotted bar R to move the keyed portion $p^6$ of the clutch on shaft $P^2$ into engagement with the portion $p^5$ prior to the movement of the portion $n^6$ of the clutch on the shaft N, which action will cause the shaft $P^2$ to pick up the slack in the chain $p^3$ first, which being accomplished then the power is communicated through the shafts N and $P^2$ and the chain-belts $m^2 p^3$ to the carriages W W and D D are moved rearwardly, and also the sides of the receptacle F and the plates P P P' M M M' are at the same time drawn out of the tick, the upper plates moving upon the platform C.

As the carriages W W and D D are moved rearwardly, the letter moving on the track-rails E E of the machine at the same time the canvas apron O is drawn or unrolled from the roller $o'$ and the end of the mattress meets the adjustable header T on the platform C, and as the canvas unrolls the mattress is left upon the upper surface of the apron in readiness to be closed and sewed together. As soon as the mattress is removed from the canvas apron the hooks $y^{17} y^{18}$ are disconnected from the lower carriages and the power is applied to the shaft $o^5$ through the belt $o^7$ on standard A', and which power is transmitted to the belt $o^{13}$, and thence to shaft $o$, carrying the apron O, and as the apron is rewound upon said roller $o'$ the lower carriages D D, the plates M M M', the racks I I, and the sides $f f$ of receptacle F are drawn forward into the position at the forward end of the machine. The variance in the distance between the outer surfaces of the platform C and the under surface of the plates $c^6 c^6$ permits the carriages W W while upon the platform C to drop a short distance. The sides $f f$ of the receptacle F are then brought together by the operation of the crank $h$ and the end gate $f^2$ replaced. The rods $y^{21} y^{21}$ are then inserted in the openings $y^{20} y^{20}$ in the hooks $y^{17} y^{17}$ on the side of the near carriage W, thence within the grooves $c^3 c^3$ in the platform C beneath the compressing-plates P P P', thence through the hooks on the outer side of the other carriage W, and the plates are in position to be raised simultaneously with the carriages.

The carriages W W being again raised in position by the operating-shafts B B, the upper carriages are moved forwardly to the forward end of the machine, the racks I I being placed in position, and the receptacle F is in readiness for the reception of more stock or filling to form another mattress.

When the machine is required to make another mattress narrow in width, the worm-rods $w^9 w^9$ are operated by the hand-wheels $w^{14}$ to rotate said rod and the upper carriages W W are drawn toward each other as far as necessary. At the same time the cranks $g^7 g^7$ on the worm-rods $g^5$ are rotated, drawing the lower carriages D D toward each other in the same degree, the wheels $e e$ on the rail-ties E' moving on the track-rail $e'$ and facilitating the movement, the longitudinal edges of the plates M' P' of the upper and lower compression-plates being closer in position to the sides of the receptacle F. The bar $t^2$ of the header T is then adjusted to the width required, in which adjustment the plates $c' c'$ of the platform C are moved inwardly, the transverse parts $c^5 c^5$ keeping the plates in position for said adjustment.

Upon the return movement of the lower carriages the racks I I are returned to their former position, so that another mattress-cover may be connected with the clamps L L. The machine may be employed to compress material in connection with the head-block T, in which case the end of the receptacle F is retained in place and the carriages D D moved forward by power.

The machine is capable of rapid manipulation commensurate with the particular kind of work and may be employed for the compression of any article to be bagged. The withdrawal of the plates M M and P P leaves the stock in the tick in a smooth and evenly-distributed position, so that the tick when stitched will be free from gatherings in the surface.

It is also obvious that modifications of the invention may be employed and the transmission of power varied as circumstances may require.

Having fully described my invention, what I now claim as new, and desire to secure by Letters Patent, is—

1. In a compressing-machine, a carriage and wheels upon said carriage a receptacle for the material to be compressed upon said carriage, having an opening at one end, and a stationary head-block within said opening, a horizontally-extended support upon said machine for said head-block and power-conveyers acting to draw the carriage in the direction of the head-block.

2. In a compressing-machine, a receptacle for the material to be compressed, a material-compressing carriage adapted to be raised from and lowered within said receptacle, suspended track-bars for said carriage and means for raising and lowering said track-bars.

3. In a compressing-machine, a receptacle for the material to be compressed, a material-compressing carriage adapted to be raised from and lowered within said receptacle, suspended track-bars for said carriage, raising and lowering devices connected with the track-bars, and compressing mechanism acting upon the carriage within the receptacle.

4. A filling device for covers to mattresses, &c., comprising separate upper and lower plates, between which the material is compressed, means for compressing said plates, upon the material, traveling devices acting to draw the cover over said plates and the compressed filling material, and means for withdrawing the plates from said cover.

5. A filling device for the cover to mattresses, &c., comprising separate upper and lower extensible plates, between which the filling material is compressed, means for compressing said plates, upon the material, traveling devices acting to draw a cover over said extensible plates, and the compressed filling material, and means for withdrawing the plates from said cover.

6. A filling device for mattress-covers, comprising separate upper and lower material-compressing plates, means for compressing said plates, upon the material, power-actuated devices acting to draw a cover over said plates and said compressed filling material, a stationary head-block in the path of the filling material and between said plates, and means for withdrawing said plates past the head-block.

7. A cover-filling apparatus for mattress-covers, &c., comprising separate upper and lower covering-plates for the material to be compressed, means for compressing said plates upon the material, clamping devices connected with and adapted to draw a cover over said upper and lower plates, guiding devices upon said clamping devices, movable over the outer surfaces of the said plates, near the edges thereof, and means for actuating the said clamping and guiding devices.

8. A compressing-carriage for mattress-cover-filling machines having sides, a series of rollers journaled in said sides, movable plates upon the surface of said rollers, and suitable plate-suspending devices on said carriage.

9. In a filling-machine for mattresses, covers, &c., the combination with upper and lower material-covering plates, of means for compressing the plates upon the material, and power-actuated devices adapted to draw a cover over said plates and the compressed material.

10. In a filling-machine for mattresses, covers, &c., the combination with separate upper and lower compressing-frames, and with feed-rollers journaled in the sides thereof, and with upper and lower plates between which the material is compressed, power-actuated devices connected with and adapted to draw cover over said plates and the compressed material, and power-conveyers communicating power to and actuating the feed-rollers.

11. In a filling-machine for mattresses, covers, &c., comprising separate parallel upper carriages, and separate parallel lower carriages, the combination of means for adjusting said carriages in position relative to each other in the same plane.

12. In a filling-machine for mattresses, covers, &c., the combination with separate upper compressing devices, having extensible parts and with separate lower material-supporting devices having extensible parts, of intermediate upper and lower plates and detachable supporting devices, for said upper plates, connected with the upper compressing devices.

13. In a filling-machine for mattresses, covers, &c., the combination with separate upper and lower material-compressing frames, of feed-rollers journaled in said frames means for forcing one of said frames downwardly upon the other and securing devices upon one of said frames engaging with the other frame.

14. A filling-machine for mattress-covers, comprising separate upper and lower material-compressing carriages, and suitable, elevated track-bars for the upper carriage, feed-rollers upon said carriages, plates upon said upper and lower feed-rollers, between which the material is compressed devices upon the upper carriage supporting the upper plates, and a stationary platform interposed between the rear ends of said upper and lower plates.

15. In a filling-machine for mattress-covers, comprising a receptacle for the material having an opening in one end, feed-rollers in the bottom of said receptacle, movable plates upon said feed-rollers and sliding supports for the forward end of said plates, and a stationary head-block upon the upper surface of said plates.

16. In a filling-machine for mattress-covers, a main supporting-frame, transverse track-rails within said frame, and movable rail-ties thereon, and longitudinal track-rails upon said ties, and separate material-supporting carriages upon said longitudinal track-rails, and means for adjusting said carriages in position in relation to each other on said transverse track-rails within said frame.

17. In a filling-machine for mattress-covers, the combination with separate upper and lower material-compressing frames, of feed-rollers journaled in the sides of said frame, transverse shafts on the said upper and lower frames, and gear upon the ends of said shaft adapted to engage with each other, and power-conveying devices on the journals of said feed-rollers and also upon the said transverse shaft connected with each other.

18. In a filling-machine for mattress-covers, the combination with the feed-roller frame, and sprocket-wheels at one end of said frame of feed-rollers in said frame, and journals upon said rollers separate idlers upon each journal, and an intermediate sprocket-wheel and parallel sprocket-chains upon said idlers, and links connecting said chains at intervals in the lengths thereof.

19. In a filling-machine for mattress-covers a receptacle having sides, a lower carriage supporting said sides, an upper compressing-carriage, and suspended track-bars for said latter carriage, feed-rollers in both upper and lower carriages, plates between the feed-rollers of said upper and lower carriages between which the material for the mattress is compressed, means for compressing the upper carriage, movable clamping devices adapted to draw a cover over said plates and said material and means for actuating the feed-rollers during the passage of the cover over said plates.

20. In a filling-machine for mattress-covers, a receptacle supporting the material, having sides and brace-bars having upwardly-extended portions connected with said sides, supporting-rods connected with said sides and extending loosely through said brace-bars, and rods extending transversely through said brace-bars, and devices on said rods for moving said sides on said supporting-rods.

21. In a filler-receptacle for mattress-covers, a frame supporting the material at the bottom, and braces having upwardly-extended arms connected with said frame, sides to said receptacle, supporting-rods connected with said sides and extending loosely through said brace-arms, crank-rods extending transversely to and through said brace-arms, crank-arms on said rods, and bars connected pivotally with the outer ends of said crank-arms, bearing upon the sides of said receptacle.

22. In a filler-receptacle for mattress-covers, the combination of separate frames supporting the material at the bottom, and traveling supports for said frames, braces connected with the separate frames having horizontal and upwardly-extended brace-arms upon the outer sides of said frames, an adjusting-rod extending through the brace-arms upon each frame adjacent to the horizontal portion of said brace, worm-wheels on said rods and worm-teeth on the horizontal portions of said braces engaging with each other.

23. In a filler-compressing and cover-filling machine for mattress-covers, the combination with suitable traveling compressing devices, of an apron connected with one of said compressing devices at one end and winding and unwinding devices connected with the other end.

24. In a filler-compressing and cover-filling machine for mattress-covers, the combination with separate, adjustably-connected carriages, and suitable track-rails therefor, of an apron adjustably connected with the separate carriages, and means for winding and unwinding said apron.

25. In a filler-compressing and cover-filling machine for mattress-covers, the combination with a lower, rearwardly-movable carriage adapted to support the cover when filled, of a stationary roller, and a fixed support therefor forward of said carriage, an apron upon said roller having its free end connected with the said carriage, an upper compressing-carriage, and suitable elevated track-bars therefor, and a stationary head-block upon the upper surface of the lower, movable carriage in the path of the filled cover.

26. A filler-compressing and cover-filling machine for mattress-covers, comprising a lower, rearwardly-movable carriage, and track-rails therefor, feed-rollers upon the upper surface of the carriage, a stationary roller and a fixed support therefor, an apron upon said roller having its free end connected with the movable carriage, suitable winding and unwinding devices connected with the said roller, an upper compressing-carriage, track-bars supporting said carriage, raising and lowering devices for said track-bars, feed-rollers on said upper carriage, between which the filling material is compressed, means for moving both carriages rearwardly in position, and a stationary head-block upon the upper surface of the lower carriage adapted to come into contact with the filling material.

27. In a filler-compressing and cover-filling machine for mattress-covers, the combination with a suitable supporting-frame, of an upper compressing, movable frame, and elevated track-bars supporting said frame, and a lower mattress-cover-supporting frame, traveling supports for said lower frame, and raising and lowering devices connected with the upper track-bars, feed-rollers upon said frame, plates connected with the rear ends of said frames between which the material is compressed, a stationary platform in rear of said movable frames, and above the surface of the lower carriage, and means for moving said carriages in rear of the forward end of said platform.

28. In a filler-compressing and cover-filling machine, a main supporting-frame and standards at each end of said frame, longitudinally-extended track-rails within said frame, and a carriage upon said track-rails for supporting the mattress-filling material, elevated track-bars above the said longitudinal track-rails, and raising and lowering devices on said standards connected with the track-bars, a transverse rotary shaft on the said frame, journaled in the standards in rear of said carriages, and power-conveying devices connected with the said shaft and the carriage on said track-rails, and devices actuated by the rearwardly-moving carriage controlling the movement of said shaft automatically.

29. In a filler-compressing and cover-filling machine for mattress-covers, a main supporting-frame and standards at each end of said frame, a filler-compressing carriage, and elevated track-bars supporting said carriage, and raising and lowering devices connected with the track-bars, transverse rods upon the sides of said carriage, plates upon the under side of said carriage adapted to come into contact with the material to be compressed, connected at their rear ends thereto, and supporting devices on said transverse rods extending beneath the said plates.

30. A head-block for filler-compressors, having separate, telescopic parts, substantially as described.

31. A head-block for filler-compressors, comprising separate, longitudinally-adjustable bars, and guide-lugs at the ends of said bars, and vertically-slidable bars in said lugs.

32. In a filler-compressing and cover-filling machine, the combination with the main supporting-standards, of power-conveying shafts journaled in the upper ends thereof, sprocket-wheels upon said shafts, and a sprocket-chain communicating power to said shafts, longitudinal bars upon the inner side of said standards, and raising and lowering devices on said shafts connected with the said bars, a movable compressing-carriage, and hangers supporting said carriage, longitudinal track-bars extending through said hangers, and transverse bars connecting said track-bars, upwardly-extended supports connected with the transverse bars, and worm-sleeves connected with the upwardly-extended bars, and a worm-shaft journaled in the longitudinal bars, near said standards, extending through the worm-sleeves, and means for operating the worm-shaft.

ERNEST J. ANTONI.

Witnesses:
THEODORE C. SPARKS,
M. CHILD, Jr.